United States Patent
Dickmann

(10) Patent No.: US 6,283,496 B1
(45) Date of Patent: Sep. 4, 2001

(54) COLLAPSIBLE GAME HAULING CARRIER

(76) Inventor: Christopher Dickmann, N3696 Country Road MM, Wautoma, WI (US) 54982

( * ) Notice: Subject to any disclaimer, the term of this patent is extended or adjusted under 35 U.S.C. 154(b) by 0 days.

(21) Appl. No.: 09/307,638

(22) Filed: May 7, 1999

(51) Int. Cl.$^7$ ..................................................... B62B 01/12
(52) U.S. Cl. ........................... 280/652; 280/655; 280/640; 280/40; 280/43.1
(58) Field of Search ..................................... 280/651, 652, 280/653, 659, 639, 640, 655, 39, 40, 42, 43.1, 63, 64, 47.17, 47.24, 47.31, 47.3, 646; 224/153, 156

(56) References Cited

U.S. PATENT DOCUMENTS

| | | |
|---|---|---|
| D. 391,734 | 3/1998 | Melgey . |
| 2,657,069 * | 10/1953 | Quist .................................. 280/47.18 |
| 3,222,100 * | 12/1965 | Lindzy ............................... 280/47.18 |
| 3,860,254 * | 1/1975 | Wegener ............................. 280/47.33 |
| 3,907,323 * | 9/1975 | Knapp et al. ........................ 280/47.3 |
| 4,063,744 * | 12/1977 | Fraser .................................... 280/655 |
| 4,313,611 * | 2/1982 | Heinze et al. .......................... 280/63 |
| 5,090,368 * | 2/1992 | Berghoefer ........................ 280/47.17 |
| 5,282,520 | 2/1994 | Walker . |
| 5,328,192 | 7/1994 | Thompson . |
| 5,330,212 * | 7/1994 | Gardner ............................. 280/47.24 |
| 5,393,194 | 2/1995 | Smith . |
| 5,433,291 * | 7/1995 | Shoestock, Sr. ........................ 182/20 |
| 5,460,307 | 10/1995 | Stevenson . |
| 5,492,196 | 2/1996 | Michno . |
| 5,564,720 | 10/1996 | Stringer . |
| 5,566,780 | 10/1996 | Bambrough . |
| 5,590,738 * | 1/1997 | Hunt et al. ............................ 182/116 |
| 5,620,193 | 4/1997 | Dschaak . |
| 5,687,978 | 11/1997 | Rhodes et al. . |
| 5,769,431 | 6/1998 | Cordova . |
| 5,820,141 * | 10/1998 | Wilkerson et al. ..................... 280/30 |
| 5,887,676 * | 3/1999 | Harbin .................................... 182/20 |
| 5,887,879 | 3/1999 | Chumley . |
| 6,039,333 * | 3/2000 | Hamblin ............................ 280/47.18 |

* cited by examiner

*Primary Examiner*—Lanna Mai
*Assistant Examiner*—Jeffrey J. Restifo
(74) *Attorney, Agent, or Firm*—Ryan, Kromholz & Manion, S.C.

(57) ABSTRACT

A collapsible carrier suitable for transporting a load over rugged terrain which includes a support frame assembly formed by at least a pair of spaced apart side frame members located on opposite sides of a longitudinal central axis of the frame. Cross frame members connect the side frame members to define a cargo bed. A pair of wheels located on opposite sides of the cargo bed are each individually supported by support members mounted on a pivot axis which is affixed to opposite sides of the side frame members and displaced laterally outwardly from the side frame members. The wheels are thus pivotable about these axes from a use position, wherein the wheels are parallel to each other, and disposed on opposite sides of the cargo bed to a storage/backpack transport position wherein the wheels are folded over one another and over said cargo bed. The side frame members are formed of collapsible sections that are either telescoped together or pivotally connected to each other. In the preferred embodiment the axes for the wheel supports are located outwardly from and below the cargo bed, thus enabling the wheels to be pivoted against the bottom of the cargo bed, overlying each other. In the preferred embodiment the support members, while being displaced equally outwardly from the sides of the cargo bed side frames, are of slightly different heights thus enabling stacking of the wheels as they are folded into the carrying position.

15 Claims, 4 Drawing Sheets

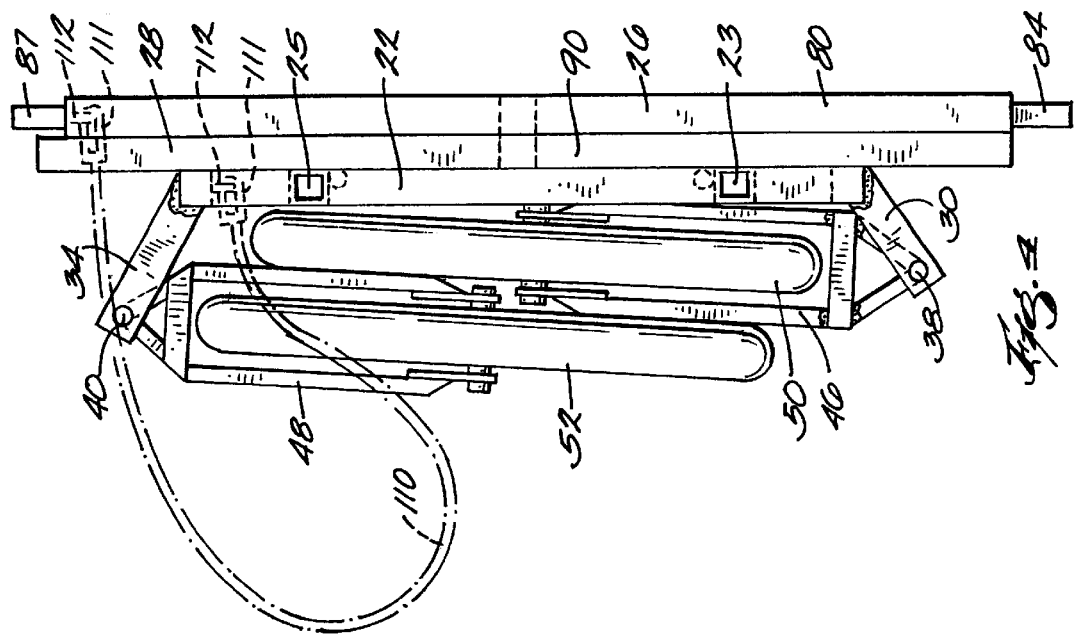
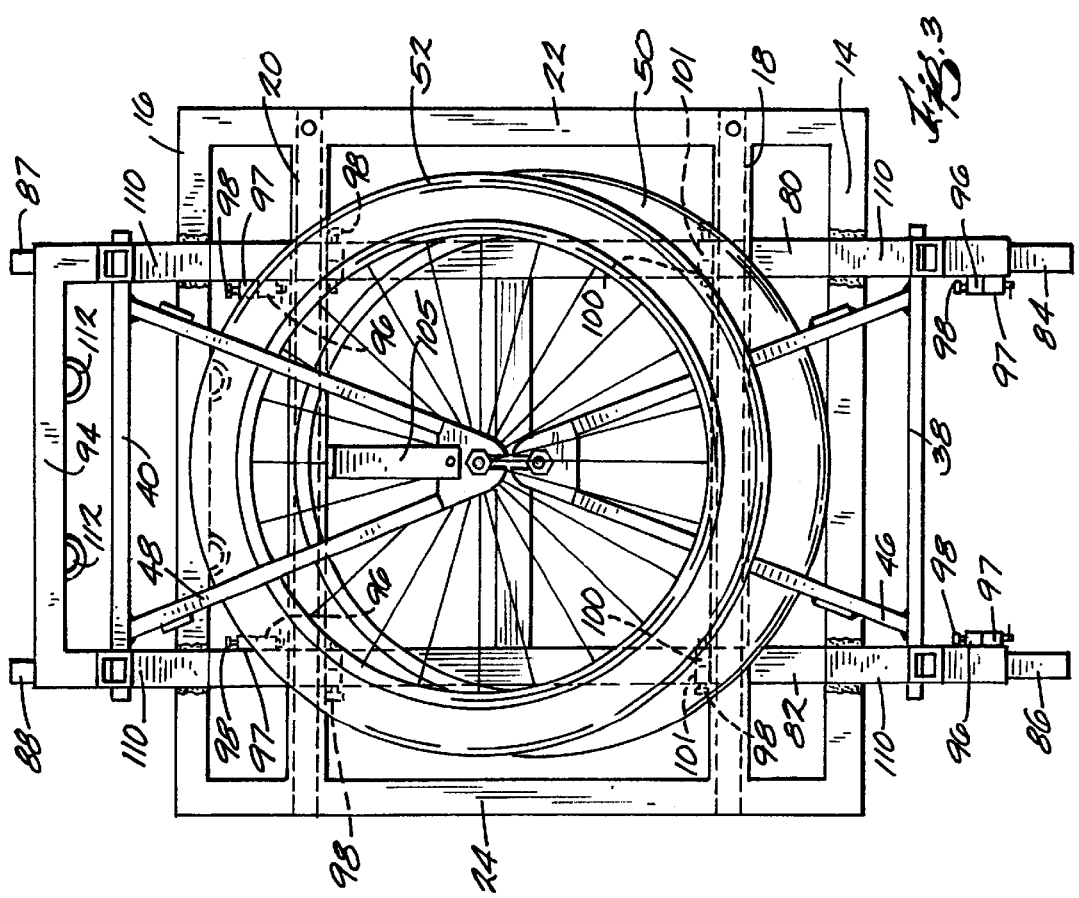

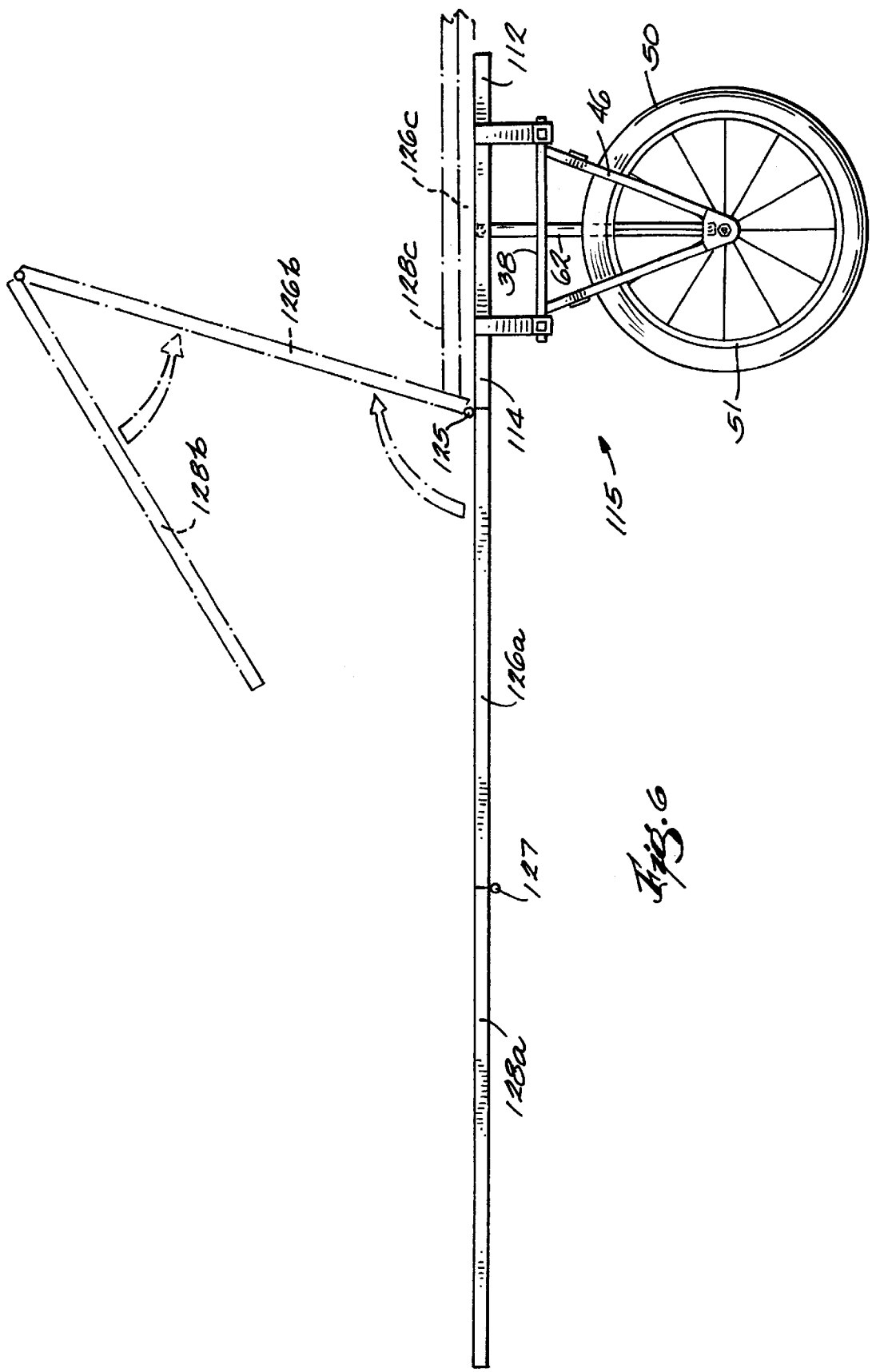

COLLAPSIBLE GAME HAULING CARRIER

The present invention relates to manual pull type carriers for transporting loads in rough terrain. More particularly, the invention relates to a carrier for transporting large game carcasses or other loads, for example, sick or injured persons, which carrier is collapsible so that it can be carried into wilderness areas, in the manner of a backpack, and erected into a transport configuration.

BACKGROUND OF THE INVENTION

Numerous devices have been heretofore devised to carry loads in rugged terrain areas which are not accessible by most motorized vehicles. For example, sportsmen often hunt in remote areas that are inaccessible by highway vehicles. Thus, the transportation of large game carcasses becomes difficult. In other situations, rescue workers are called on to transport sick or injured persons from such areas.

Examples of prior devices are shown in U.S. Pat. No. 5,328,192 (Thompson); U.S. Pat. No. 5,433,291 (Shoestock, Sr.); U.S. Pat. No. 5,566,780 (Bambrough); U.S. Pat. No. 5,687,978 (Rhodes et al.); U.S. Pat. No. 5,620,193 (Dschaak); Des. U.S. Pat. No. 391,734 (Melgey); U.S. Pat. No. 5,460,307 (Stevenson); U.S. Pat. No. 5,492,196 (Michno); and U.S. Pat. No. 5,564,720 (Stringer). The various prior devices have suffered from numerous shortcomings. For example, in order to transport the carriers in the manner of a backpack, the wheels of the carrier generally have had to be of small diameter. See, for example, Stringer U.S. Pat. No. 5,564,720. Devices with mall wheels are not easy to roll over difficult, rough terrain which often contains rocks, stumps, or other hazards. Other prior art examples, illustrated by the foregoing patents, in some cases, had larger diameter wheels, but the same have had to be removed from the axles in order to transport the devices on a user's back.

A need has, thus, continued to exist for new and improved portable load carrying carriers which are stable and easy to use when assembled, and which are readily collapsed to a form wherein they are portable in the manner of a backpack.

SUMMARY OF THE INVENTION

The present invention has, as its principal object, the provision of a collapsible carrier which is easy to use and convenient to collapse and carry. In accordance with another aspect of the invention, the carrier of this invention has a relatively large diameter wheels which allow the use of an axle positioned a sufficient distance above the ground so as to enable the carrier to be moved over objects such as rocks and stumps. In accordance with a related aspect, the frame of the carrier is structured so as to support the cargo bed of the carrier at a raised elevation.

In accordance with a further related aspect of the invention, the device of this invention is formed of lightweight hollow metallic tubes which provide a relatively lightweight construction that can be carried on the back of an average adult. A further important aspect of the invention is the provision of such a carrier in which the wheels remain attached to the carrier in the carrying position. The wheels are supported on pivoting supports which, in a storage/transport position are folded to allow the wheels to be stacked against the load-carrying bed of the carrier.

In accordance with another aspect of the preferred embodiment of the invention the load carrying frame is formed of hollow metallic tubes such as steel or aluminum tubes which are of a telescoping configuration, enabling the load carrying frame to be disassembled and placed into a storage/backpack transport configuration. In accordance with another aspect of the invention, the wheels are pivotable inwardly in a manner resembling aircraft wheels.

Briefly, the invention provides a collapsible carrier suitable for transporting a load over rugged terrain which includes a support frame assembly formed by at least a pair of spaced-apart side frame members located on opposite sides of a longitudinal central axis of the frame. Cross frame members connect the side frame members to define a cargo bed. A pair of wheels located on opposite sides of the cargo bed are each individually supported by support members mounted on a pivot axis which are each affixed to opposite sides of the side frame members and displaced lower than and laterally outwardly from the side frame members. The wheels are thus pivotable about these axes from a use position, wherein the wheels are parallel to each other, and disposed on opposite sides of the cargo bed to a storage/backpack transport position wherein the wheels are folded over one another and over the cargo bed. The side frame members are formed of collapsible sections which are either telescoped together or pivotally connected to each other. The frame is formed of sections which extend forwardly from the cargo bed to form a towing handle portion. In the preferred embodiment the axes on which the wheel supports are pivoted are located outwardly from and below the cargo bed, thus enabling the wheels to be pivoted against the bottom of the cargo bed, overlying each other. In the preferred embodiment the support members, while being displaced equally outwardly from the sides of the cargo bed side frames, are of slightly different heights thus enabling stacking of the wheels as they are folded into the carrying position.

In an alternative embodiment of the invention the forwardly extending frame, which forms a towing handle section, is formed of two or more sections which are hinged together and can be folded over the cargo bed in zig zag fashion in the carrying position.

Further aspects and objects of the invention will be apparent from the appended claims, the following detailed description and the drawings.

BRIEF DESCRIPTION OF THE DRAWINGS

FIG. 3 is a view showing the carrier of FIG. 1 in a collapsed position;

FIG. 4 is a side view of the carrier of FIG. 3 in the collapsed position;

FIG. 5 is a fragmentary view showing details of the arrangement used for fastening the collapsed components of the carrier in the collapsed position; and, FIG. 6 is a side elevational view illustrating an alternative embodiment of the invention.

DETAILED DESCRIPTION OF THE INVENTION

Figure 1:
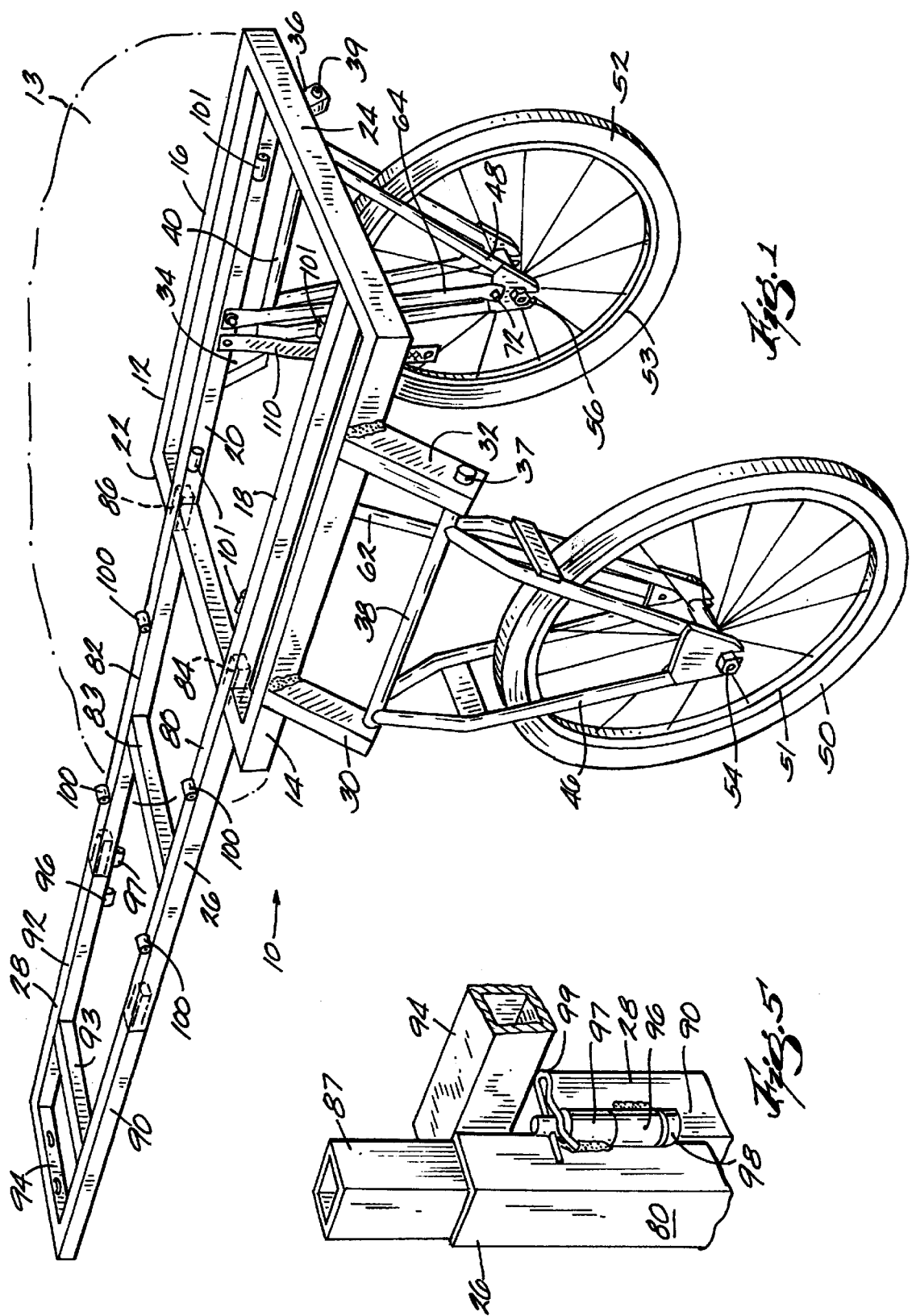
FIG. 1 is an isometric view of a preferred embodiment of the collapsible carrier of this invention.

Referring more particularly to the drawings, there is seen in FIGS. 1–4 a preferred embodiment of a collapsible hauling carrier 10 of this invention. Carrier 10 includes a cargo bed 12. A general form of cargo 13 is shown by phantom lines in FIG. 1. Cargo 13 may be, for example, the carcass of a big game animal such as deer, elk, moose, etc. Alternatively, the cargo 13 may be an injured or ill human carried, for example, on a straight board. The invention, thus, provides an alternative to the use of a stretcher for such purposes. Cargo bed 12 includes a minimum of two rails 14 and 16 oriented parallel to the central longitudinal axis of the carrier 10. In the preferred embodiment additional rails 18 and 20 form a part of the cargo-carrying bed, along with at least two cross members 22 and 24. Towing handle sections 26 and 28 are removably attached to the load-carrying bed 12 as will be subsequently explained in greater detail.

A pair of downwardly and outwardly angled hollow tubular support members 30 and 32 are welded or otherwise affixed to the side of longitudinal member 14. In similar fashion another pair of tubular support members 34 and 36 are affixed to side member 16. Support brackets 30 and 32 support an axle 37 which pivotally supports a sleeve 38. Connected to sleeve 38 is a fork 46 which supports tire 50 mounted on a rim 51 which is mounted on an axle 54. The fork and wheel components maybe of a typical bicycle type. Similarly, on the opposite side of carrier 10 an axle 39 pivotally supports a sleeve 40 which carries a fork 48, which in turn supports tire 52 mounted on rim 53 located on a hub 56.

Figure 2:
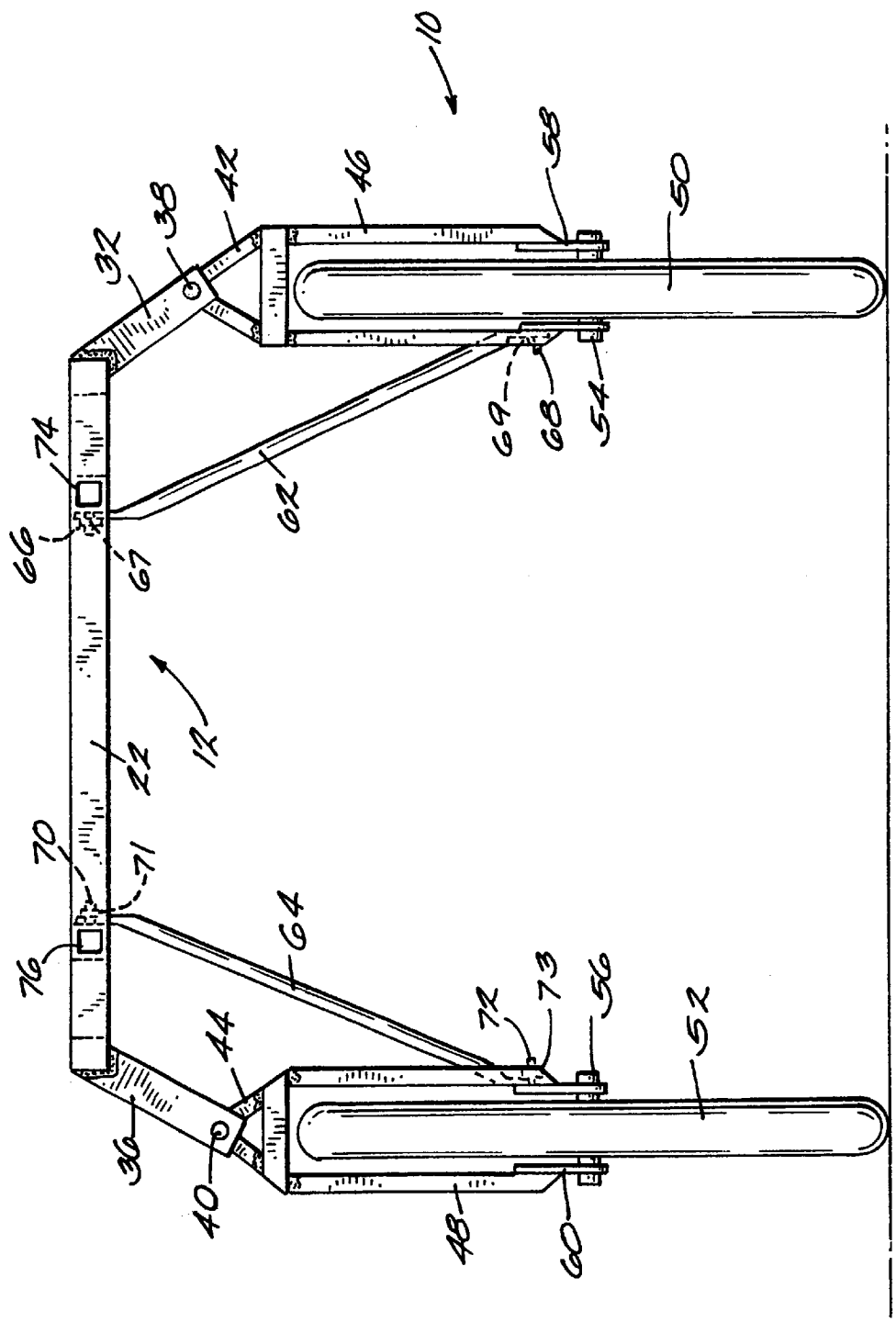
FIG. 2 is a front elevational view of the carrier of FIG. 1.

In the use position illustrated in FIGS. 1 and 2 a pair of braces 62 and 64 maintain the fork assemblies 46 and 48 in the use position with the tires 50 and 52 approximately parallel to each other. For this purpose, a bolt 66 is mounted through cross frame member 18 to receive a hole (not shown) in the upper end of brace 62. A nut 67, preferably a wingnut, is used to retain the brace 62 on stud 66. Similarly, a hole through the bottom end of brace 62 fits over another bolt 68 mounted through fork assembly 46. The lower end of brace 62 is retained on stud 68 by means of another wingnut 69. In similar fashion, the upper end of brace 64 is mounted on a stud 70 mounted which is through longitudinal member 20 and retained in place by a nut 71. The lower end of brace 64 is mounted over a stud 72 carried on fork 48 by means of another nut 73.

As seen from FIG. 2 hollow opening 74 and 76 are provided through the cross frame member 22. These openings receive end 84 of longitudinal side member of intermediate section 26 while opening 76 receives a similar end 86 of longitudinal member 82. Ends 84 and 86 are of a cross section of sufficiently reduced dimensions to be received within openings 74 and 76. The opposite ends of longitudinal members 80 and 82 are also provided with extensions 87 and 88 of reduced dimensions. Sections 87 and 88 are received telescopingly within the interiors of longitudinal members 90 and 92 of end section 28. Section 26 is provided with at least one cross member 83 while end section 28 is provided with a similar cross member 93. Section 28 is also provided with an end member 94. For convenience in setting up and disassembling the carrier, the sections of reduced dimensions 84, 86, 87 and 88 can also be provided with outwardly biased depressible knobs (not shown) which are received in mating openings provided in openings 74, 76, 90 and 92. Other releasable locking mechanisms can also be used, as will be apparent to those skilled in the art.

The invention also provides a means to securely retain the components of the carrier in the storage/transport position of FIGS. 3 and 4. The preferred means includes matching sleeve or collar sections which can readily be pinned together. Referring to FIG. 5, for example, sections 26 and 28 can be stacked overlying each other and secured together by aligning collar sections 96 and 97 so that a pin 98 can be inserted therethrough. Pin 98 is provided with openings to receive a pin or cotter key 99. In similar fashion middle section 26 is provided with a number of sleeves 100 welded thereto. Sleeve or collar sections 100 are alignable with cooperating sleeve sections 101 welded to members 18 and 20 of the cargo bed 12. As seen in FIG. 3 these sections can also be affixed together by means of a pin 98.

In order to retain wheels 50 and 52 in place, a strap 105 is provided which is attached near the apex of fork 48 and also to a frame member, in this case, member 20, preferably by means of snap connectors. In order to enable carrying of the collapsed carrier in the manner of a backpack, two or more straps 110 are affixed to the collapsed carrier. For that purpose, a number of loops 112 are provided, onto which snap-type end fittings 111 of straps 110 can be attached. In practice the member 26 would be laid against the back of the user and the user will affix one strap 110 around each shoulder. If desired, a waist strap can also be provided. In the collapsed position it is convenient to store the braces 62 and 64 within the hollow interior of the tubes, for example, interiors 23 and 25 of members 18 and 20.

While the carrier has been shown as being made out of square hollow tubes, which may be steel, preferably these tubes are formed of aluminum in order to reduce the weight of the carrier. Also, hollow round tubes can be substituted for those of a rectangular configuration and are preferred in many applications.

Referring to FIG. 6, there is seen an alternate version 115 of the carrier of this invention. Carrier 115 may include many of the same components used in carrier 10, thus similar numbers indicate identical parts. In the modified embodiment carrier bed 112 includes a side rail 114 to which a middle section 126a is hingedly connected by means of an appropriate hinge 125. Similarly a hinge 127 connects sections 126a and 128a. As shown by phantom lines, in the intermediate position during folding, the sections are indicated as 126b and 128b. In the final, storage transport position, these sections are shown by further phantom lines and indicated as sections 126c and 128c. Use of such hinge connections may simplify the operation of the carrier, and, further, ensures that components of the carrier are not misplaced during disassembly or transport.

Tires 50 and 52 may be an inflatable type, which is usually preferred for weight minimization. However, in some terrains, particularly where tire puncturing cacti are present, the use of hard rubber tires may be necessary.

It will be apparent to those skilled in the art that various modifications of the foregoing illustrative embodiments are possible. Thus, the invention also encompasses any and all embodiments within the scope of the following claims.

What is claimed is:

1. A collapsible carrier suitable for transporting a load over rugged terrain comprising:

a support frame assembly including a pair of spaced first and second side frame members, located on opposite sides of a longitudinal central axis, and cross frame members affixed on opposite ends to said side frame members having upper surfaces defining a cargo bed and opposed lower surfaces;

a first member defining a pivot axis affixed to said first side member and a second member defining a second pivot axis affixed to said second side frame member, each of said pivot axes being displaced laterally outwardly and downwardly from said respective first and second side frame members and being supported by a plurality of support arms extending from said respective frame members to said first and second pivot axis defining members;

a wheel support pivotally connected to each of said pivot axis;

a wheel mounted on each said wheel support, said support, being pivotable from a first, use position wherein said wheels are parallel to each other and spaced apart on opposite sides of said longitudinal axis, and a second position wherein said wheels are folded overlying each other over said lower surfaces of said cargo bed, removable struts for affixing said wheels in said first position, and a handle section removably connected to said cargo bed.

2. A collapsible carrier according to claim 1 wherein said handle section comprises a plurality of segments which are movable from a first position, wherein said sections are affixed together to form said handle section, to a second position wherein said segments overlie each other, whereby said carrier is portable in said second position.

3. A collapsible carrier according to claim 2 wherein said sections are affixed together by telescoping connections.

4. A collapsible carrier according to claim 2 wherein said sections are hinged together and are pivotable between said first and second positions.

5. A collapsible carrier according to claim 2 wherein loops are provided for attachment of shoulder straps to said carrier whereby said carrier can be carried in backpack style upon a user's back.

6. A carrier according to claim 2 wherein side frame members are provided a first sleeve section, side affixed to said side frame members and handle segments, said first sleeve section on a first one of said side frame members being alignable with a scond sleeve section on a second one of said side frame members whereby said frame can be pinned together in said second position.

7. A carrier according to claim 1 wherein said struts are storable within the hollow interior of said frame members.

8. A carrier according to claim 1 wherein said frame sections are formed from hollow metallic tubes.

9. A carrier according to claim 7 wherein said tube sections are square in cross section.

10. A carrier according to claim 7 wherein said tube sections are circular in cross section.

11. A carrier according to claim 1 wherein said wheels are provided with inflatable rubber tires.

12. A carrier according to claim 1 wherein said wheels are provided with hard rubber tires.

13. A carrier according to claim 1 wherein said wheels are each mounted on a fork which supports an axle for each of each said wheels, said fork being pivotally mounted on said axis.

14. A carrier according to claim 12 wherein said pivot axis each comprise a central shaft, and a sleeve integral with said fork is pivotally mounted over said shaft.

15. A carrier according to claim 7 wherein straps provided with snap type fasteners are provided for locking said carrier in the collapsed position.

* * * * *

UNITED STATES PATENT AND TRADEMARK OFFICE
CERTIFICATE OF CORRECTION

PATENT NO. : 6,283,496 B1
DATED : September 4, 2001
INVENTOR(S) : Christopher Dickmann It is certified that error appears in the above-identified patent and that said Letters Patent is hereby corrected as shown below:

Column 5,
Line 25, after "wherein" insert -- said --.
Line 26, after "provided" insert -- with --.
Line 26, delete "section, side affixed" and substitute -- section, affixed --.

Column 6,
Line 1, delete "scond" and substitute -- second --.

Signed and Sealed this

Thirteenth Day of April, 2004

JON W. DUDAS
*Acting Director of the United States Patent and Trademark Office*